(12) United States Patent
Togashi

(10) Patent No.: US 8,310,808 B2
(45) Date of Patent: Nov. 13, 2012

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 262 days.

(21) Appl. No.: 11/987,894

(22) Filed: Dec. 5, 2007

(65) Prior Publication Data

US 2008/0144253 A1 Jun. 19, 2008

(30) Foreign Application Priority Data

Dec. 14, 2006 (JP) ................................. 2006-337303

(51) Int. Cl.
*H01G 4/06* (2006.01)
*H01G 4/005* (2006.01)

(52) U.S. Cl. ..................................... 361/321.2; 361/303

(58) Field of Classification Search .................. 361/303, 361/309, 310, 308.1, 301.4, 311, 306.2, 306.3, 361/321.2
See application file for complete search history.

(56) References Cited

U.S. PATENT DOCUMENTS

| | | | |
|---|---|---|---|
| 6,191,933 B1 * | 2/2001 | Ishigaki et al. | 361/309 |
| 6,377,439 B1 * | 4/2002 | Sekidou et al. | 361/303 |
| 6,385,034 B2 * | 5/2002 | Tanaka | 361/306.3 |
| 6,661,640 B2 * | 12/2003 | Togashi | 361/306.3 |
| 6,781,816 B2 * | 8/2004 | Togashi | 361/306.3 |
| 6,965,507 B2 * | 11/2005 | Togashi et al. | 361/303 |
| 7,177,138 B2 * | 2/2007 | Yoshii et al. | 361/306.3 |
| 7,230,815 B2 * | 6/2007 | Yoon et al. | 361/303 |
| 7,292,429 B2 * | 11/2007 | Randall et al. | 361/303 |
| 7,414,857 B2 * | 8/2008 | Ritter et al. | 361/756 |
| 7,417,196 B2 * | 8/2008 | Wada et al. | 174/260 |

FOREIGN PATENT DOCUMENTS

| | | |
|---|---|---|
| JP | A 2004-140183 | 5/2004 |
| JP | A-2004-342846 | 12/2004 |

* cited by examiner

*Primary Examiner* — David M Sinclair
(74) *Attorney, Agent, or Firm* — Oliff & Berridge, PLC

(57) ABSTRACT

A multilayer capacitor includes a dielectric body formed by a plurality of dielectric layers, a first conductor layer, a second conductor layer, a first terminal electrode, and a second terminal electrode formed on a first side face of side faces of the dielectric body in parallel to a stacking direction Z. The first and second conductor layers respectively include first and second lead portions connected to the first and second terminal electrodes. A relation $(a+c)/(b \times n) \leq 0.035$ is formed between a length "a" between the first and second lead portions in a vertical direction to the stacking direction Z, a length "b" between conductor layers positioned at both ends of the dielectric body in the stacking direction, a space length "c" between the first side face and the first conductor layer, a total number "n" of the conductor layers.

10 Claims, 16 Drawing Sheets

MULTILAYER CAPACITOR

BACKGROUND OF THE INVENTION

1. Field of the Invention

The present invention relates to multilayer capacitor greatly reducing the equivalent serial inductance (ESL) and production method thereof, more particularly relates to a multilayer capacitor used as a decoupling capacitor etc.

2. Description of the Related Art

In recent years, while advances have been made in reducing the voltage of power sources used for supplying power to large-scale integrated circuits (LSI's) and other integrated circuits, the load current has increased.

Therefore, it has become extremely difficult to keep fluctuations in the power source voltage to within tolerances when faced with rapid changes in the load current. Therefore, as indicated in FIG. 2, a decoupling capacitor 100 (for example two-terminal structure multilayer ceramic capacitor) is now being connected to a power source 102. At the time of transitory fluctuation in the load current, current is supplied from this multilayer ceramic capacitor 100 to the LSI 104 of the central processing unit (CPU) etc. to suppress fluctuation of the power source voltage.

Along with the increasingly higher operating frequencies of today's CPU's, however, the fluctuations in the load current have become faster and larger. Multilayer ceramic capacitor 100 having the equivalent serial inductance (ESL), shown in FIG. 2, itself now has a great impact on fluctuations of the power source voltage.

That is, since the ESL is high in a conventional multilayer ceramic capacitor 100, fluctuation of the power source voltage V easily becomes greater in the same way as above along with fluctuations in the load current i.

That is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dV = ESL \cdot di/dt \quad \text{equation 1}$$

where, dV is transitory fluctuation of voltage (V),
di is the fluctuation of current (A), and
dt is the time of fluctuation (sec).

As a multilayer capacitor wherein the ESL is reduced, a multilayer capacitor shown in Japanese Patent Application Laid Open No. 2004-140183 is known. In the multilayer capacitor shown in the Japanese Patent Application Laid Open No. 2004-140183, conductor layers are positioned perpendicularly to a ground plane (in a capacitor, a side face opposed to a substrate). According to the multilayer capacitor, the ESL can be reduced less than 250 pH. Along with the increasingly higher operating frequencies of CPU's, however, further reducing the ESL is required. Also, recently, due to an operating voltage of IC has become as low as a level of 1V, under a condition that current fluctuation level di/dt is 1000 A/μsec, an ultra voltage dV must be set within a range of ±60 mV (an acceptable range within ±6% of 1V of the operating voltage of IC). Therefore, the ESL is required to be reduced less than 60 pH ($\therefore$ from equation 1, ESL=dv/(di/dt) =60×10$^{-3}$/1000/10$^{-6}$=60 pH).

Further, as a multilayer capacitor wherein the ESL is reduced, a multi-terminal multilayer capacitor is known. In the multi-terminal multilayer capacitor, by increasing external terminal electrode, current flow varying in direction can be realized in a conductor layer. As a result, further reducing of the ESL becomes possible.

However, in the multi-terminal capacitor, there are problems that preparing a plurality of conductor layer patterns is necessary, and that increasing number of external terminals results in higher manufacturing cost.

SUMMARY OF INVENTION

The present invention was made in the view of such circumstance, and the object of the present invention is to provide a multilayer capacitor, not a multi-terminal capacitor, able to greatly reduce the ESL with low manufacturing cost.

Means for Solving Problem

To attain the above object, there is provided a multilayer capacitor comprising;

a dielectric body having an approximately rectangular parallelepiped shape formed by alternately stacking a plurality of dielectric layers, first conductor layers and second conductor layers;

a first terminal electrode formed on a first side face parallel to the stacking direction of said dielectric layers, said first conductor layers and said second conductor layers, a second terminal electrode formed on said first side face apart from said first terminal electrode, wherein;

said first conductor layers comprises a first lead portion led out to said first side face and is connected to said first terminal electrode;

said second conductor layers comprise a second lead portion led out to said first face and is connected to said second terminal electrode;

in the case that a length between said first lead portion and said second portion in a vertical direction to said stacking layer direction is "a";

in the case that in pluralities of said first conductor layers and said second conductor layers, a length between the conductor layers positioned at both ends of said dielectric body in said stacking direction is "b";

in the case that a space length between said first side face and said first conductor layers or between said first side face and said second conductor layers are "c";

in the case that total number of said first conductor layers and said second conductor layers is "n";

$$(a+c)/(b \times n) \leq 0.035.$$

According to the multilayer capacitor of the present invention, in the case that said first terminal electrode and said second terminal electrode are formed on said first side face, said first side face is to be set to face to a circuit substrate.

According to a multilayer capacitor having a construction which fulfills $(a+c)/(b \times n) \leq 0.035$, the ESL of the multilayer capacitor can be reduced less than 60 pH.

In the multilayer capacitor according to the present invention, pluralities of said first conductor layers or said second conductor layers may comprise more than two kinds of conductor layers having different electrode patterns. In this case, said length "a" and said space length "c" are obtained respectively by calculating averages between more than two kinds of conductor layers.

Preferably, said first terminal electrode is formed straddling said first side face, a second side face opposed to said first side face, and a third side face parallel to said stacking direction of said dielectric body adjacent to said first side face and said second side face of side faces of said dielectric body, said second terminal electrode is formed straddling said first side face, said second side face, and a fourth side face opposed to said third face of side faces of said dielectric body, said first lead portion led out straddling said first side face, said second side face and said third side face and is connected to said first terminal electrode, said second lead portion led out and straddling said first side face, said second side face and said fourth side face and is connected to said second terminal electrode.

By connecting the first lead portion to the first terminal electrode formed straddling the first, the second and the third side faces, a current flow area of an electric current which flows between the first terminal electrode and the first conductor layers electrode becomes larger. As a result of this, the ESL of whole multilayer capacitor can be reduced.

By connecting the second lead portion to the second terminal electrode formed straddling the first, the second and the fourth side faces, a current flow area of an electric current which flows between the second terminal electrode and the second conductor layers becomes larger. As a result of this, the ESL of whole multilayer capacitor can be reduced.

That is, according to the multilayer capacitor of the present invention, as described in above, a great reduction in the ESL of the multilayer capacitor is achieved, fluctuation of the power source voltage can be suppressed, and it can be suitably used as a decoupling capacitor, etc.

In the multilayer capacitor according to the present invention, in case that said first terminal electrode and said second terminal electrodes are formed on said first side face and said second side face, any one of said first side face or said second side face may be installed to face a substrate. Namely, in the multilayer capacitor according to the present invention, installation directionality of multilayer capacitor to circuit substrate can be eliminated.

Preferably, in said first lead portion, at a position along with said first side face, said second side face or said third face, a first space pattern is formed which is not connected to said first terminal electrode.

Preferably, in said second lead portion, at a position along with said first side face, said second side face or said fourth side face, a second space pattern is formed which is not connected to said second terminal electrode.

In the case of forming the dielectric body by stacking the dielectric layer, the first conductor layer and the second conductor layer, the first space pattern and the second space pattern are being as markers, interlayer can be aligned, and stacking misalignment can be prevented.

Note that in the present invention, a first conductor layer and a second conductor layer are relative conceptions, the first conductor layer and the second conductor layer may be reversed. Also, as to the other "first . . . " and "second . . . ", they are similar.

DESCRIPTION OF THE PREFERRED EMBODIMENTS

First Embodiment

Figure 1:
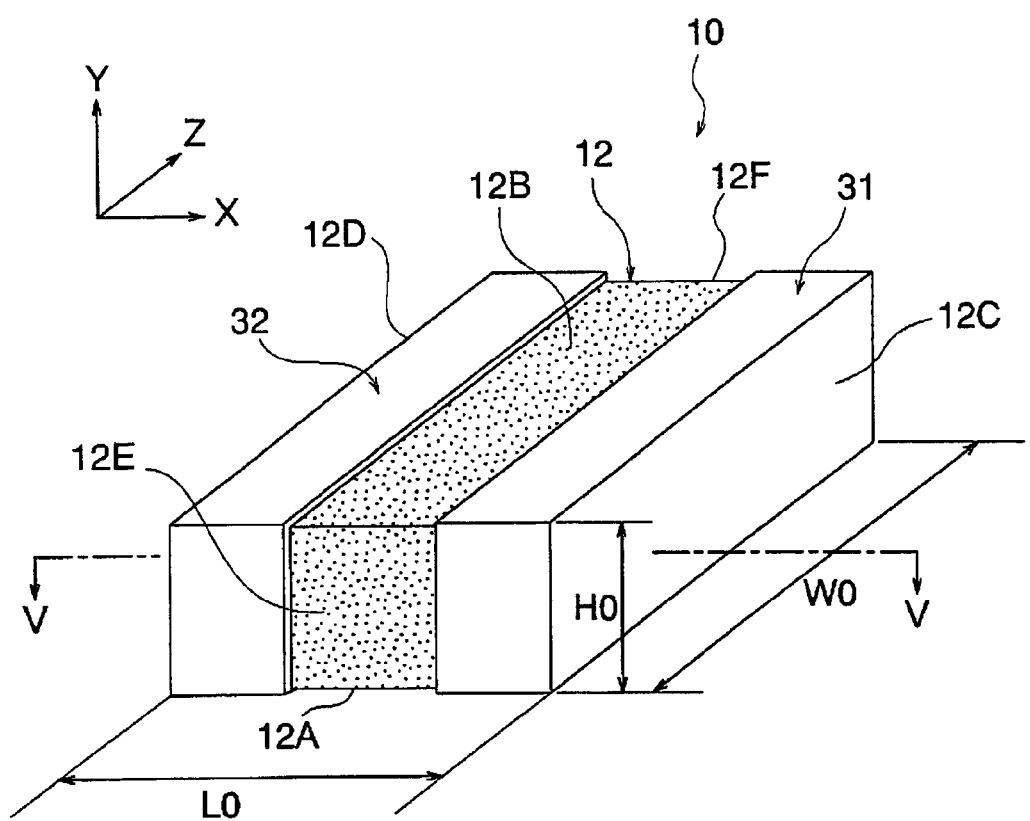
FIG. 1 is a perspective view of a multilayer capacitor in a first embodiment of the present invention.

Whole constitution of a multilayer ceramic capacitor (herein after simply referred to as a "multilayer capacitor") 10 of a first embodiment of the present invention is specified. As shown in FIG. 1, the multilayer capacitor 10 comprises a dielectric body 12, a rectangular parallelepiped shaped sintered body obtained by firing a stack of a plurality of ceramic green sheets as dielectric layers.

The dielectric body 12 comprises a first side face 12A and a second side face 12B opposed to the first side face. Also, the dielectric body 12 comprises a third side face 12C and a fourth side face 12D which are adjacent to the first side face 12A and the second side face 12B, and parallel to the stacking direction Z of the dielectric body, plus opposed to each other. The dielectric body also comprises a fifth side face 12E and a sixth side face 12F vertical to the stacking direction Z and opposed to each other.

In the present embodiment, preferably, as shown in FIG. 1, length LO of the first side face 12A and the second side face 12B in the vertical direction X to the stacking direction Z of the dielectric layer is smaller than width WO of the first side face 12A and the second side face 12B in the staking direction Z of the dielectric layer.

Namely, by setting a width W0 of the dielectric body 12 along the stacking direction Z of the dielectric layer larger than a length L0 of the dielectric body along a X direction connecting a pair of terminal electrodes 31 and 32, at the time of the multilayer capacitor is installed to a substrate, the multilayer capacitor can be stably installed with a positioning relation that the dielectric layer and each conductor layers are vertically stacked to a plane direction of the substrate. That is, a construction in which the dielectric layer and each conductor layers to be vertical can easily be realized. As a result, a current flow loop becomes shortened and a loop inductance can be reduced.

Although a dimension of the dielectric body 12 is not particularly limited, normally L0 (0.8 to 1.2) mm×W0 (1.6 to 2.0) mm×H0 (0.5 to 0.8) mm or so.

On side faces of the dielectric body 12, a first terminal electrode 31 is formed straddling a first side face 12A, a second side face 12B, a third side face 12C, a fifth side face 12E and a sixth side face 12F. Also, a second terminal electrode 32 is formed straddling the first side face 12A, the second side face 12B, a fourth side face 12D, the fifth side face 12E and the sixth side face 12F. Note that the first terminal electrode 31 and the second terminal electrode 32 are disassociated completely, as being insulated each other, in the first side face 12A, the second side face 12B, the fifth side face 12E and the sixth side face 12F.

Figure 3:
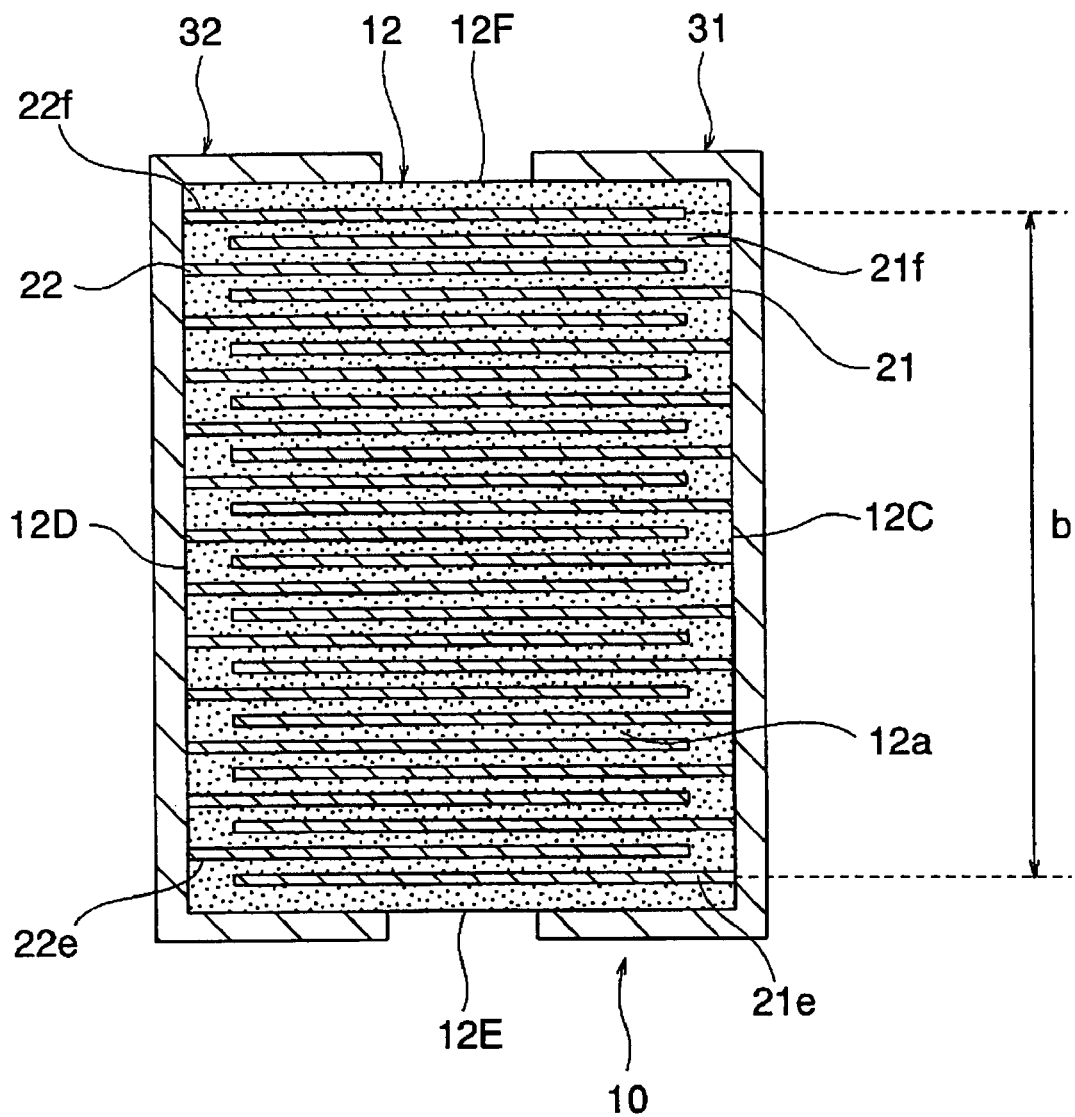
FIG. 3 is a cross sectional view of the multilayer capacitor of FIG. 1 and a cross sectional view of a dielectric body, first conductor layers and second conductor layers in a ZX plane direction.
Figure 3:
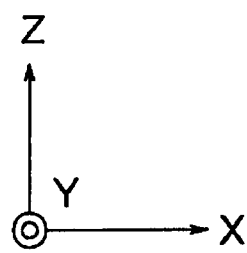

As shown in FIG. 3, in the dielectric body 12, a first conductor layer 21 and a second conductor layer 22 are alternately stacked via a dielectric layer 12a so as to overlap each other in the stacking direction Z, and the internal electrode layer of the capacitor is formed. In the present embodiment, thirteen each of the first and the second conductor layers 21 and 22 are alternately arranged in the dielectric body 12, sandwiched between the dielectric layers 12a. Note that, as the material of these conductor layers 21 and 22, not only may base metal materials such as nickel, nickel alloy, copper, or copper alloy be considered, but also materials having these materials as main ingredient may be considered.

As shown in FIG. 3, the multilayer capacitor 10 is, in the stacking direction Z, a length (a length between a first conductor layer 21e on the fifth side face 12E side and a second conductor layer 22f on the sixth side face 12F side) between conductor layers positioned at both end of the dielectric body 12 (the fifth side face 12E and the sixth side face 12F) is "b".

Figure 4A:
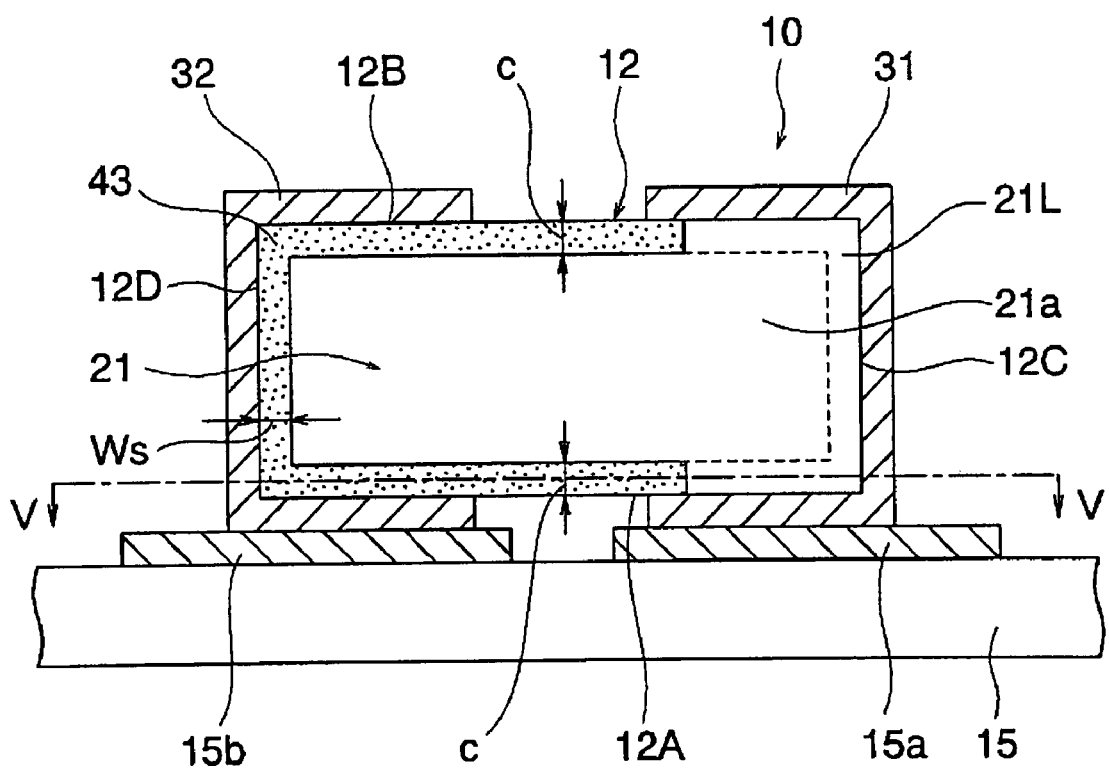
FIG. 4A is a plane view of a first conductor layer of a first embodiment of the present invention viewing from stacking direction Z.
Figure 4A:
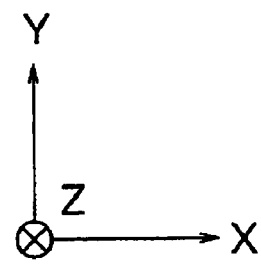

As shown in FIG. 4A, the first conductor layer 21 has a shape corresponding to an external shape of the dielectric layer 12a, and a first conductor layer main body portion 21a spaced with predetermined insulating space pattern 43 from circumference end portion of the dielectric layer 12a. This first conductor layer body portion 21a is a portion which composes one of an electrode of a capacitor. The first conductor layer 21 is formed on the same plane with the first conductor layer main body portion 21a integrally, and further comprises a first lead portion 21L led out straddling three adjacent side faces of the dielectric body 12 each other (the first side face 12A, the second side face 12B, the third side face 12C). In the first lead portion 21L, the first conductor layer 21 and the first terminal electrode 31 are connected.

A space length (a length at Y direction) between the first side face 12A to face to a circuit substrate 15 and the first conductor layer 12 (the first conductor layer main body portion 21a) is "c". Also, a space length (a length at Y direction) between the second side face 12B and the first conductor layer 21 (the first conductor layer main body portion 21a) is "c", as similar.

Figure 4B:
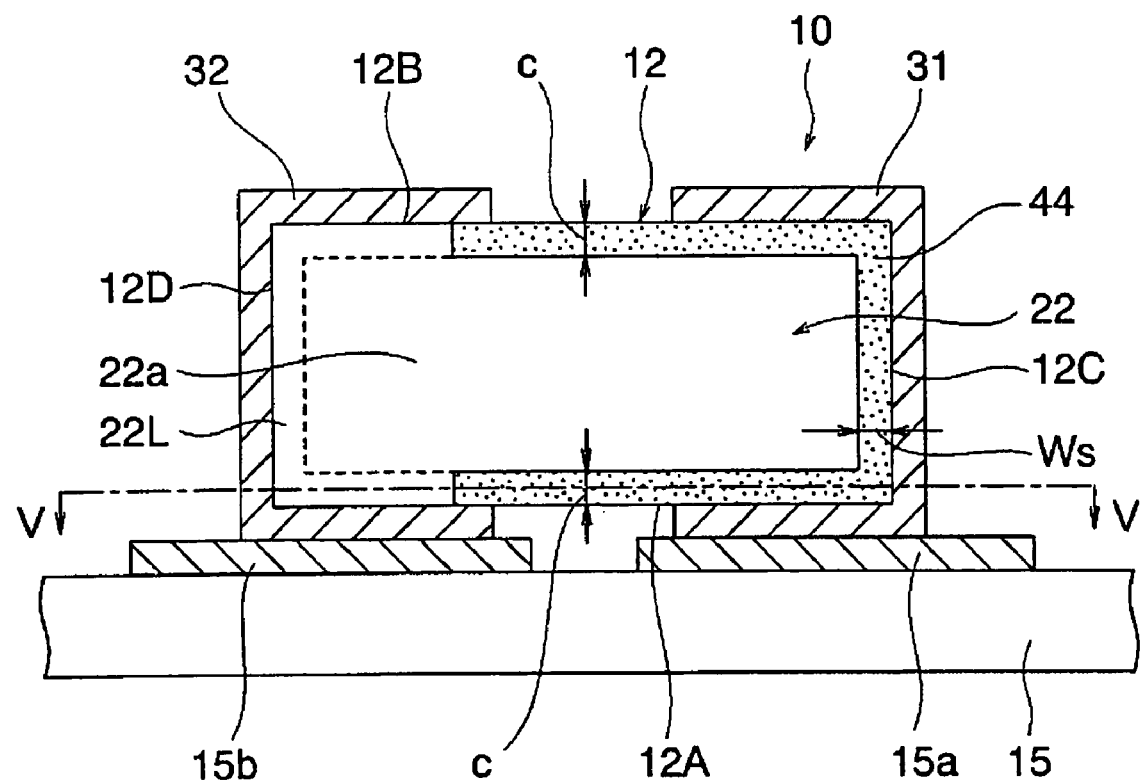
FIG. 4B is a plane view of a second conductor layer of a first embodiment of the present invention viewing from stacking direction Z.
Figure 4B:
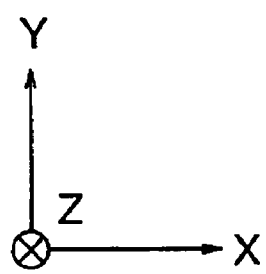

As shown in FIG. 4B, the second conductor layer 22 has a shape corresponding to an external shape of the dielectric layer 12a, and a second conductor layer main body portion 22a spaced with predetermined insulating space pattern 44 from circumference end portion of the dielectric layer 12a. This second conductor layer body portion 22a is a portion which composes the other electrode of a capacitor. The second conductor layer 22 is formed on the same plane with the second conductor layer main body portion 22a integrally, and further comprises a second lead portion 22L led out straddling three adjacent side faces of the dielectric body 12 each other (the first side face 12A, the second side face 12B, the fourth side face 12D). In the second lead portion 22L, the second conductor layer 22 and the second terminal electrode 32 are connected.

A space length (a length at Y direction) between the first side face 12A to face to the circuit substrate 15 and the second conductor layer 22 (the second conductor layer main body portion 22a) is "c". Also, a space length (a length at Y direction) between the second side face 12B and the second conductor layer 22 (the second conductor layer main body portion 22a) is "c", as similar.

A space width Ws of the space pattern 43 of FIG. 4A or a space width Ws of the space pattern 44 of FIG. 4B is preferably 100 to 200 μm or so. If the Ws is too small, the insulation properties with the first terminal electrode 31 and the second conductor layer 22 or the second terminal electrode 32 and the first conductor layer 21 are liable to be insufficient; when Ws is too large, areas of each conductor layers will be narrower and an ability as a capacitor is liable to decline.

As shown in FIG. 4A and FIG. 4B, the second conductor layer 22 has a shape that the first conductor layer 21 is rotated 180 degree in a XY plane. Namely, in the present embodiment, the first conductor layer 21 and the second conductor layer 22 are relative conceptions, the first conductor layer 21 and the second conductor layer 22 may be reversed.

As shown in FIG. 4A and FIG. 4B, the first terminal electrode 31 and the second terminal electrode 32 formed on said first side face 12A are connected with a substrate side terminal electrode 15a. Namely, the first side face 12A is opposed to the circuit substrate 15. Note that, the multilayer capacitor 10 according to the present embodiment has a similar structure even it is turned 180 degree in the XY plane direction. Thus, the first terminal electrode 31 and the second terminal electrode 32 formed on the second side face 12B may be connected with the substrate side terminal electrode 15a. Namely, the second side face 12B may oppose the circuit substrate 15.

Namely, in the present embodiment, due to the first terminal electrode 31 and the second terminal electrode 32 are formed on both face of the first side face 12A and the second side face 12B, a directionality when installing the multilayer capacitor to the circuit can be eliminated.

Figure 2:
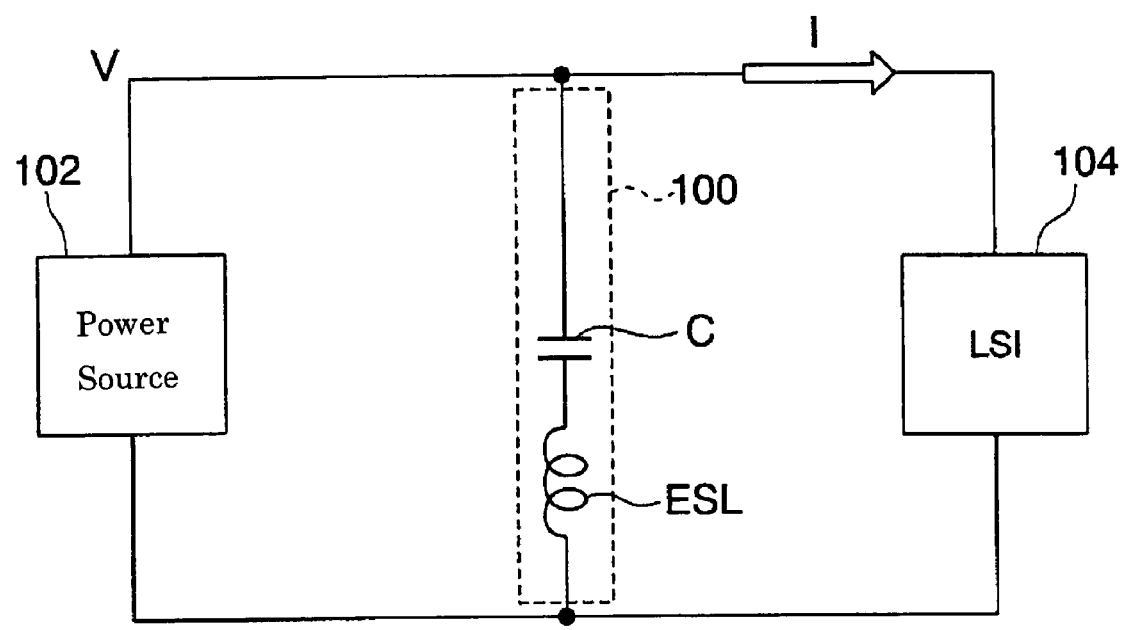
FIG. 2 is a circuit diagram wherein the multilayer capacitor in the first embodiment of the present invention is integrated.

In this way the multilayer capacitor 10 installed on the circuit substrate 15 (FIG. 2) is used as decoupling capacitor, etc.

Figure 5:
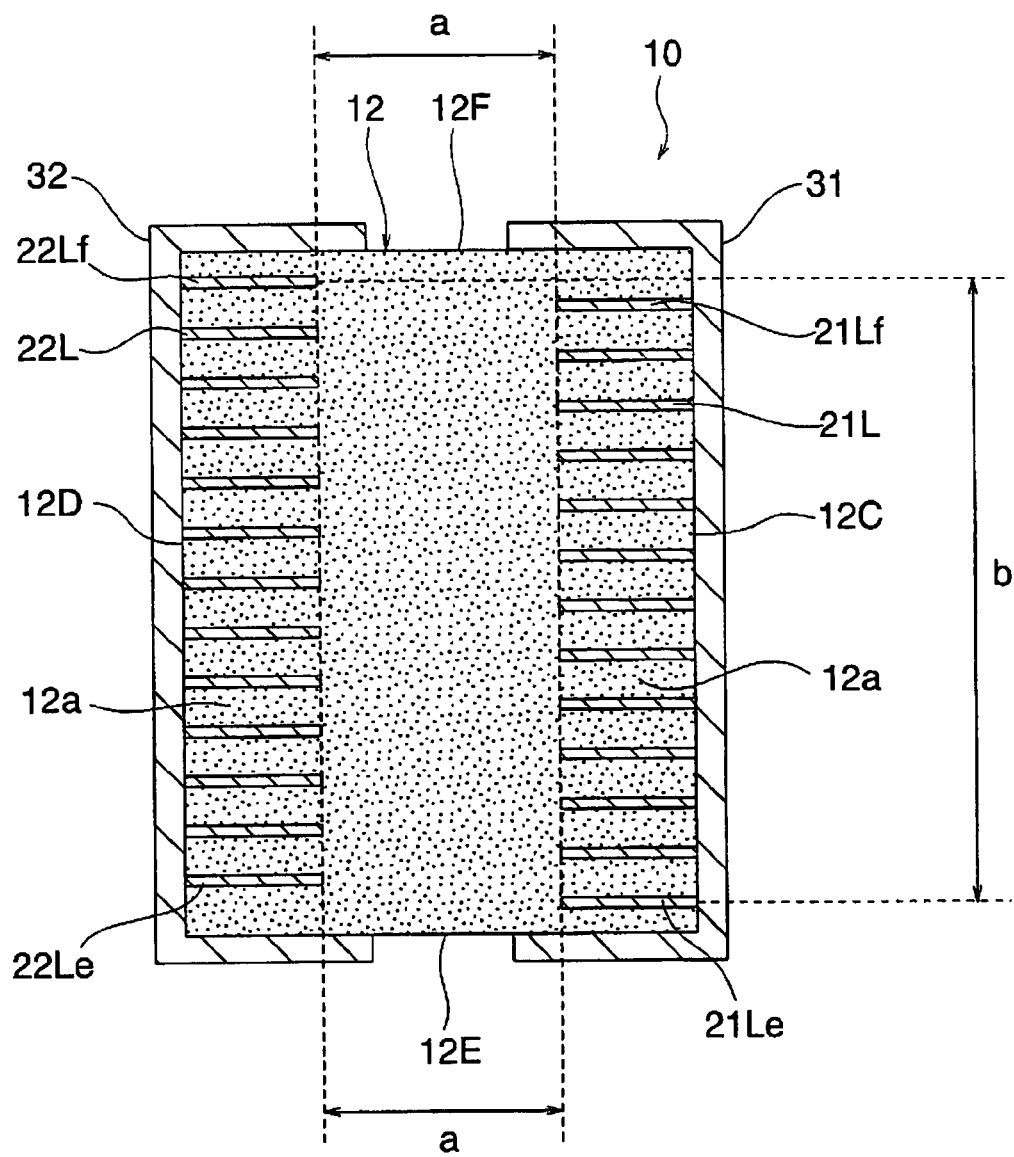
FIG. 5 is a cross sectional view of the multilayer capacitor shown in FIGS. 1, 4A and 4B viewing from V direction and a cross sectional view of a first lead portion and a second lead portion in ZX plane direction.

As shown in FIG. 5, a length between the first lead portion 21L and the second lead portion 22L is "a" in a direction X which is vertical to the stacking direction Z.

In the present embodiment, a relational equation $(a+c)/(b \times n) \leqq 0.035$ is formed between the length "a" (FIG. 5) of the first lead portions 21Le and 21Lf and the second lead portions 22Le and 22Lf at the direction X vertical to the stacking direction Z, the length "b" (FIG. 3) of the first conductor layer 21e and the second conductor layer 22f positioned at both ends of the dielectric body 12 in the stacking direction Z, the space length "c" (FIGS. 4A, 4B) of the first side face 12A and the first conductor layer 21 or between the first side face 12A and the second conductor layer 22, and a total number of the first conductor layer 21 and the second conductor layer 22 is "n" (in FIG. 3, n=26).

When the ESL of the multilayer capacitor is regarded as a function of (a+c)/(b×n), (a+c)/(b×n)=0.035 becomes a flexion point. Therefore, if a value of (a+c)/(b×n) becomes less than 0.0035, the ESL of the multilayer capacitor dramatically decreases which is less than 60 pH. Namely, by the multilayer capacitor 10 has a constitution which fulfills (a+c)/(b×n) ≦0.035, the ESL of the multilayer capacitor can be reduced less than 60 pH.

In the multilayer capacitor 10, by making the length "a" (FIG. 5) or the space length "c" (FIGS. 4A, 4B) smaller, (a+c)/(b×n)≦0.035 is available and the ESL of the multilayer capacitor can be reduced to less than 60 pH.

In the multilayer capacitor 10, by making the length "b" (FIG. 3) or the total number of conductor layers larger, (a+c)/(b×n)≦0.035 is available and the ESL of the multilayer capacitor can be reduced to less than 60 pH.

In the present embodiment, as shown in FIG. 4A, the first lead portion 21L of the each first conductor layers are connected to the first terminal electrode 31 formed straddling three side faces of the first side face 12A, the second side face 12B and the third side face 12C. As a result, a flow area of the current which flows between the first terminal electrode 31 and the first conductor layer 21 becomes larger, the ESL of whole multilayer capacitor 10 can be reduced.

In the present embodiment, as shown in FIG. 4B, the second lead portion 22L of the each second conductor layers are connected to the second terminal electrode 32 formed straddling three side faces of the first side face 12A, the second side face 12B and the fourth side face 12D. As a result, a flow area of the current which flows between the second terminal electrode 32 and the second conductor layer 22 becomes larger, the ESL of whole multilayer capacitor 10 can be reduced.

In this manner, according to the multilayer capacitor 10 of the present embodiment, a great reduction in the ESL of the multilayer capacitor 10 is achieved, fluctuation of the power source voltage can be suppressed, and the capacitor can be suitably used as a decoupling capacitor, etc. Particularly, by reducing the ESL of the multilayer capacitor less than 60 pH, stabilization of the current and voltage, reducing number of component required for manufacturing multilayer capacitor and lower cost thereof become possible.

Second Embodiment

Next, a second embodiment of the present invention will be explained. Note that, in the following, explanation of common matters of the first embodiment and the second embodiment are omitted and only different points of both embodiments will be explained.

Figure 6A:
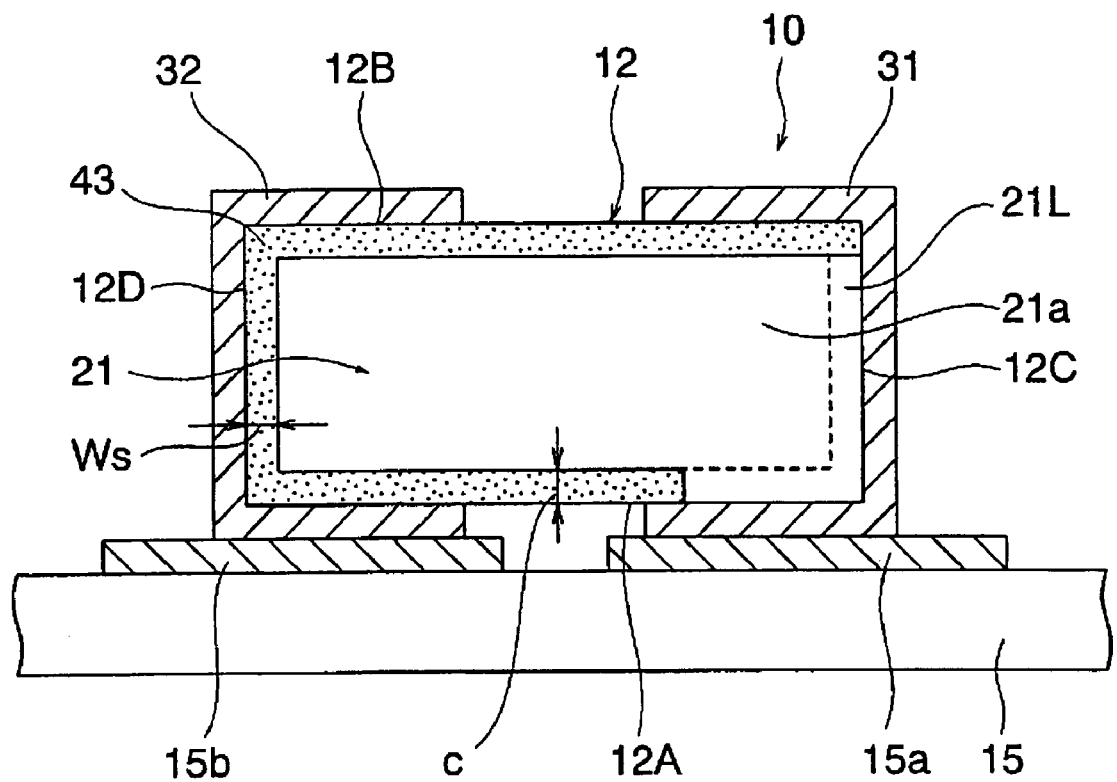
FIG. 6A is a plane view of a first conductor layer of a multilayer capacitor of a second embodiment of the present invention viewing from stacking direction Z.

As shown in FIG. 6A, the first conductor layer 21 has a shape corresponding to an external shape of the dielectric layer 12a, and a first conductor layer main body portion 21a spaced with predetermined insulating space pattern 43 from circumference end portion of the dielectric layer 12a. This first conductor layer body portion 21a is a portion which composes one of an electrode of a capacitor. The first conductor layer 21 is formed on the same plane with the first conductor layer main body portion 21a integrally, and further comprises a first lead portion 21L led out straddling two adjacent side faces of the dielectric body 12 each other (the first side face 12A, the third side face 12C). In the first lead portion 21L, the first conductor layer 21 and the first terminal electrode 31 are connected.

A space length (a length at Y direction) between the first side face 12A opposed to the circuit substrate 15 and the first conductor layer 21 (the first conductor layer main body portion 21a) is "c".

Figure 6B:
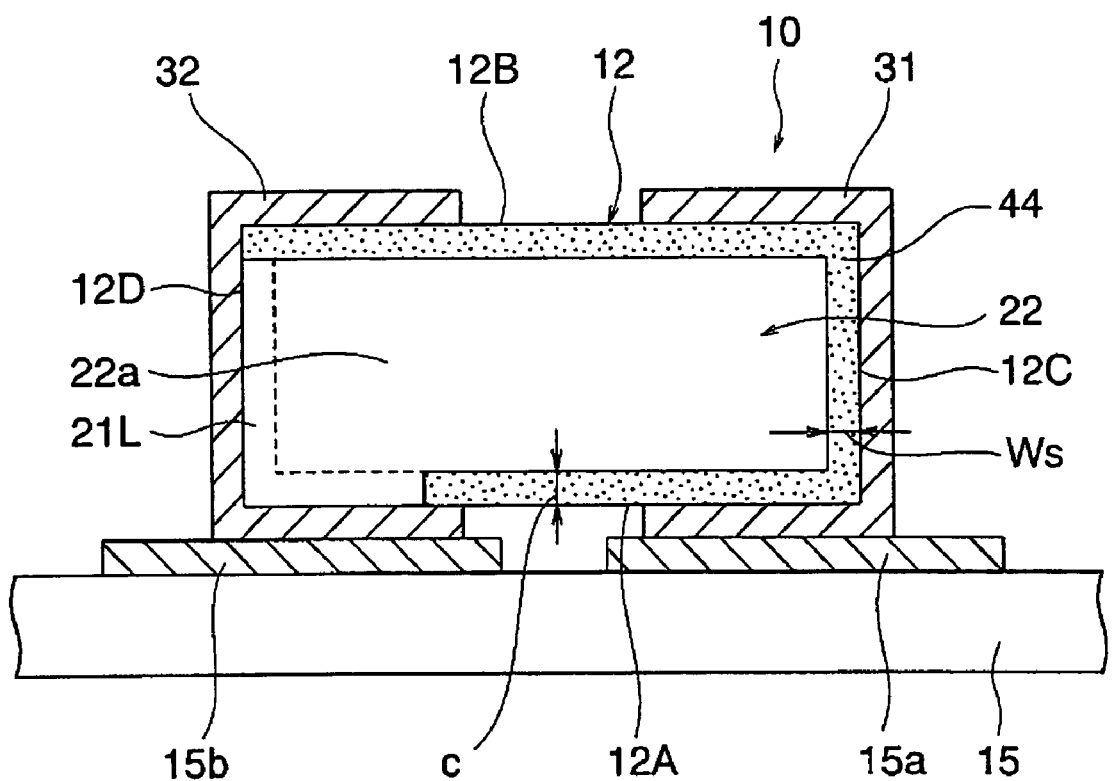
FIG. 6B is a plane view of a second conductor layer of the multilayer capacitor of the second embodiment of the present invention.
Figure 6B:
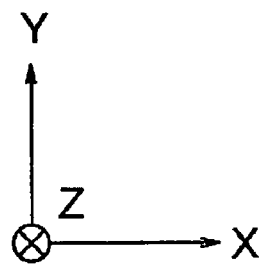

As shown in FIG. 6B, the second conductor layer 22 has a shape corresponding to an external shape of the dielectric layer 12a, and a second conductor layer main body portion 22a spaced with predetermined insulating space pattern 44 from circumference end portion of the dielectric layer 12a. This second conductor layer body portion 22a is a portion which composes the other electrode of a capacitor. The second conductor layer 22 is formed on the same plane with the second conductor layer main body portion 22a integrally, and further comprises a second lead portion 22L led out straddling two adjacent side faces of the dielectric body 12 each other (the first side face 12A, the fourth side face 12D). In the second lead portion 22L, the second conductor layer 22 and the second terminal electrode 32 are connected.

A space length (a length at Y direction) between the first side face 12A opposed to the circuit substrate 15 and the second conductor layer 22 (the second conductor layer main body portion 22a) is "c".

In the present embodiment, as shown in FIG. 6A and FIG. 6B, the second conductor layer 22 has a shape that the first conductor layer 21 is turned 180 degree as rotation axis Y. Namely, in the present embodiment, the first conductor layer 21 and the second conductor layer 22 are relative conceptions, and the first conductor layer 21 and the second conductor layer 22 may be reversed.

Also, as shown in FIG. 6A and FIG. 6B, in the multilayer ceramic capacitor 10, the first terminal electrode 31 and the second terminal electrode 32 formed on said first side face 12A are connected with a substrate side terminal electrodes 15a, 15b. Namely, the first side face 12A is opposed to the circuit substrate 15.

Third Embodiment

Next, a third embodiment of the present invention will be explained. Note that, in the following, explanation of common matters of the first embodiment and the third embodiment are omitted and only different points of both embodiments will be explained.

Figure 7A:
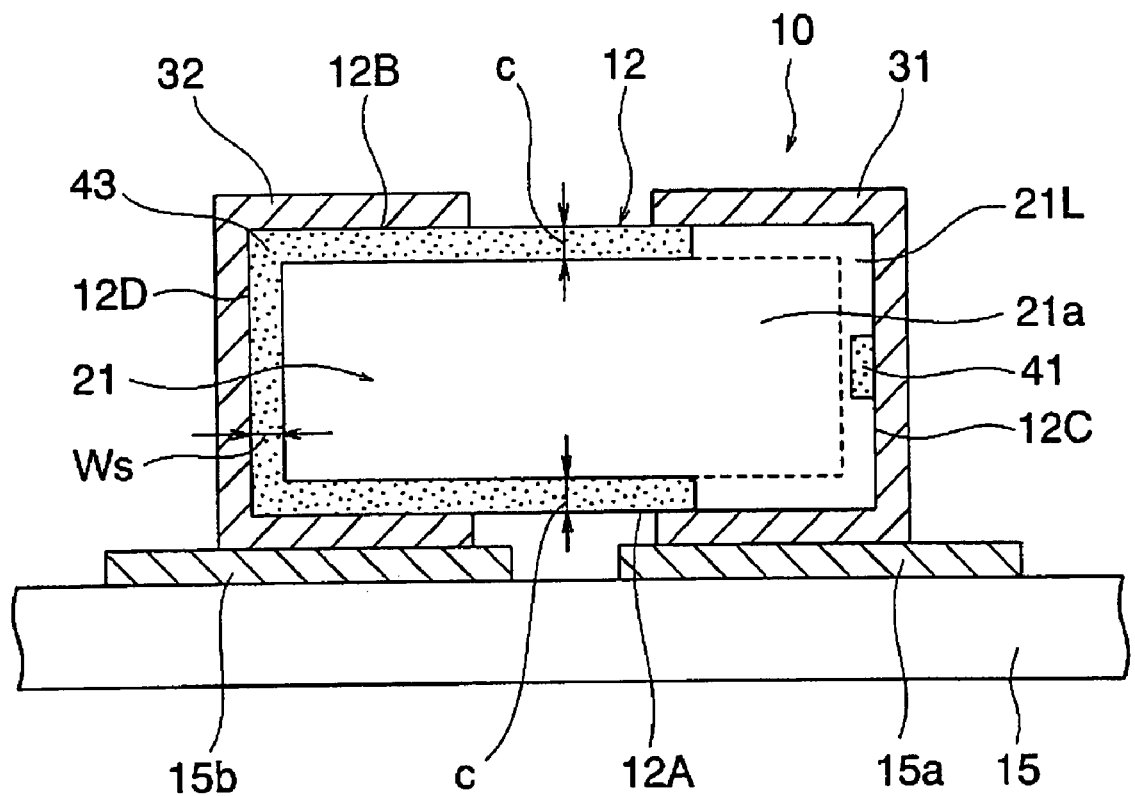
FIG. 7A is a plane view of a first conductor layer of a multi layer capacitor of a third embodiment of the present invention.
Figure 7A:
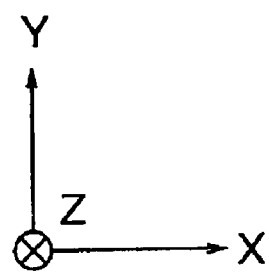

In the present embodiment, as shown in FIG. 7A, in the first lead portion 21L, the first space pattern 41, which is not connected with said first terminal electrode 31, is formed at a position along with the third side face 12C.

In the case of stacking the dielectric body 12a, the first conductor layer 21 and the second conductor layer 22, in the third side face 12C, stacking misalignment can be prevented by arranging each of the first space pattern 41 in the stacking direction Z.

Figure 7B:
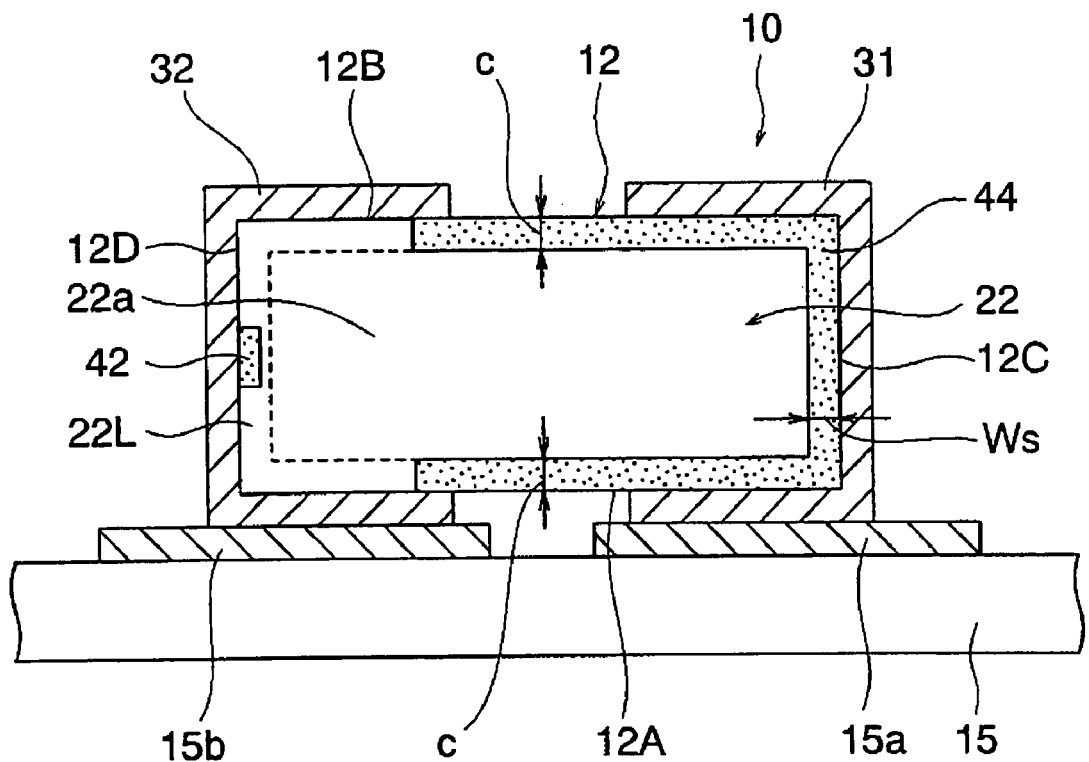
FIG. 7B is a plane view of a second conductor layer of the multilayer capacitor of the third embodiment of the present invention.
Figure 7B:
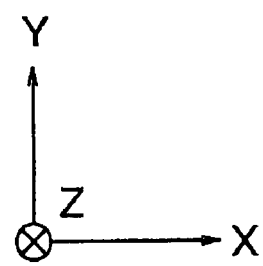

In the present embodiment, as shown in FIG. 7B, in the second lead portion 22L, the second space pattern 42, which is not connected with said second terminal electrode 32, is formed at a position along with the fourth side face 12D.

In the case of stacking the dielectric body 12a and the second conductor layer 22, in the fourth side face 12D, stacking misalignment can be prevented by arranging each of the second space patterns 42 in the stacking direction Z.

Namely, in the present embodiment, in the case of forming the dielectric body 12 by stacking the dielectric layer 12a, the first conductor layer 21 and the second conductor layer 22, interlayer can be aligned using the first space pattern 41 and the second space pattern 42 are being as markers, and stacking misalignment can be prevented.

Figure 7C:
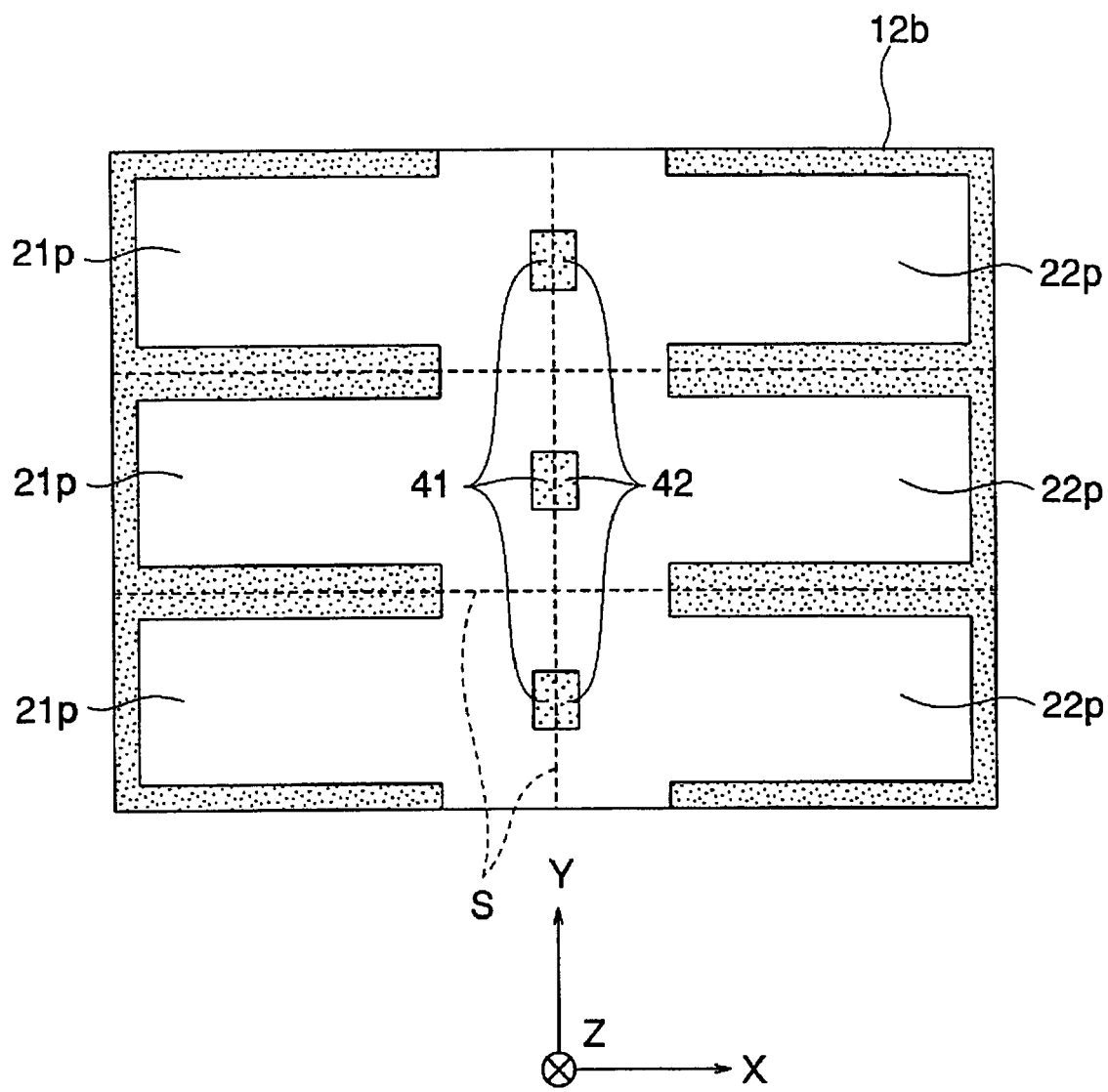
FIG. 7C a schematic view showing a process of forming, stacking a dielectric layer, a first conductor layer and a second conductor layer of the multilayer capacitor of the third embodiment of the present invention.

Note that, in manufacturing the multilayer capacitor 10, stacking the dielectric layer 12a, the first conductor layer 21 having the first space pattern 41 and the second conductor layer having the second space pattern 42 is done as follows;

At first, as shown in FIG. 7C, a first electrode pattern 21p which becomes the first conductor layer 21 in the multilayer capacitor 10 after completed and a second electrode pattern 22p which becomes the second conductor layer 22 in the multilayer capacitor 10 after completed are printed on a surface of a green sheet 12b which becomes dielectric layer 12a in the multilayer capacitor 10 after completed. In the first electrode patter 21p and the second electrode pattern 22p, the first space pattern 41 and the second space pattern are formed.

Figure 7D:
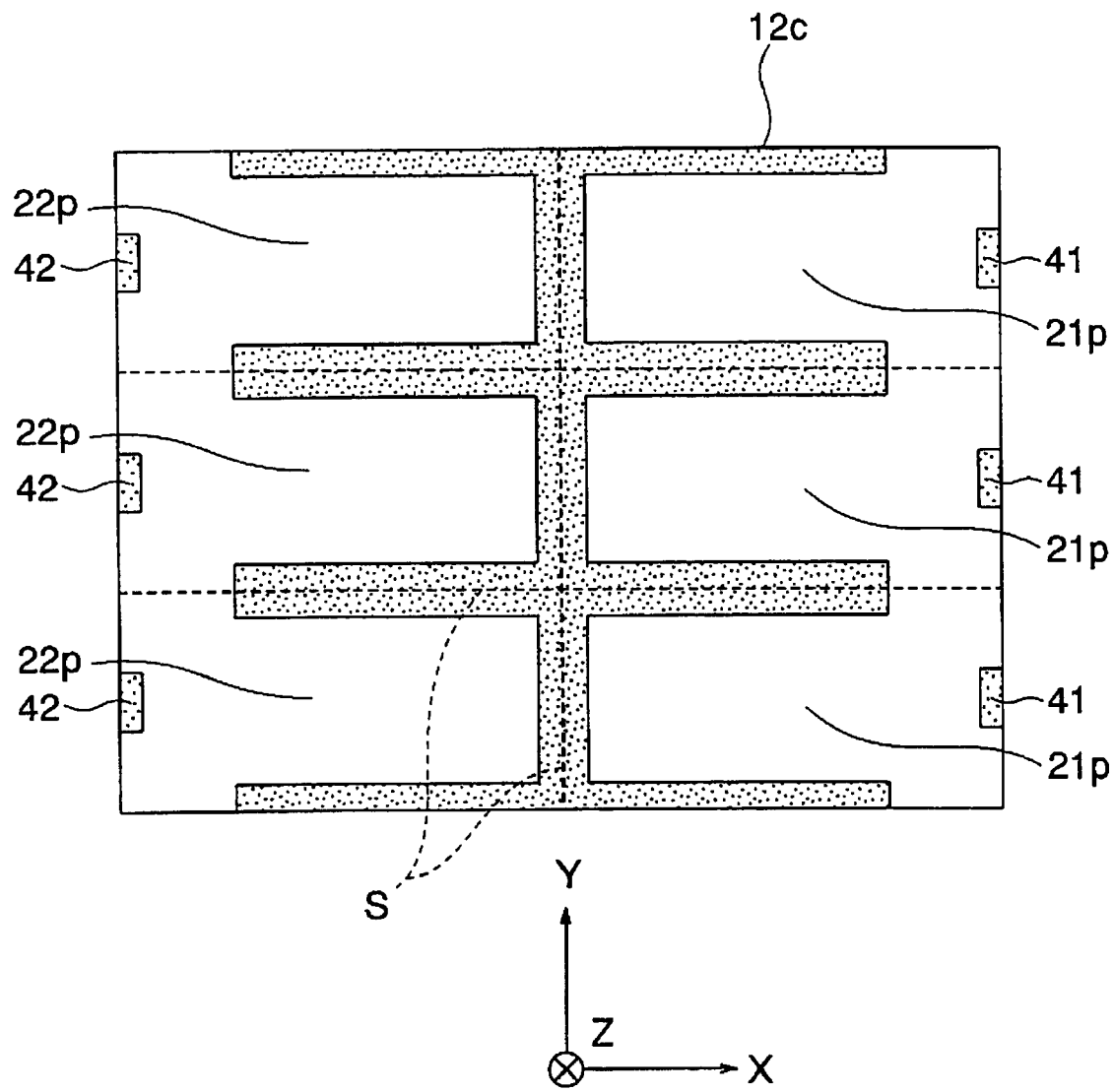
FIG. 7D is a schematic view showing a process of forming, stacking a dielectric layer, a first conductor layer and a second conductor layer of the multilayer capacitor of the third embodiment of the present invention.

Also, as shown in FIG. 7D, the first electrode pattern 21p which becomes the first conductor layer 21 in the multilayer capacitor 10 after completed and the second electrode pattern 22p which becomes the second conductor layer 22 in the multilayer capacitor after completed are printed on a surface of green sheet 12c in which becomes the dielectric layer 12a in the multilayer capacitor 10 after completed. In the first electrode pattern 21p and the second electrode pattern 22p, the first space pattern 41 and the second space pattern 42 are formed.

Next, pluralities of the green sheets 12b and the green sheets 12c, wherein the electrode patterns 21p, 22p and the space patterns 41, 42 are formed, are alternately stacked to form a multilayer body. By cutting the multilayer body along a cutting line S wherein the space patterns 41 and 42 are crossing, pre-firing dielectric body 12 is formed.

As stated above, by cutting the multilayer body using the space pattern 41 and 42 as markers, the multilayer body can be cut accurately and uniformly.

Fourth Embodiment

Next, a fourth embodiment of the present invention will be explained. Note that, in the following, explanation of common matters of the first embodiment, the third embodiment and the fourth embodiment are omitted and only different points of the first embodiment and the third embodiment will be explained.

Figure 8A:
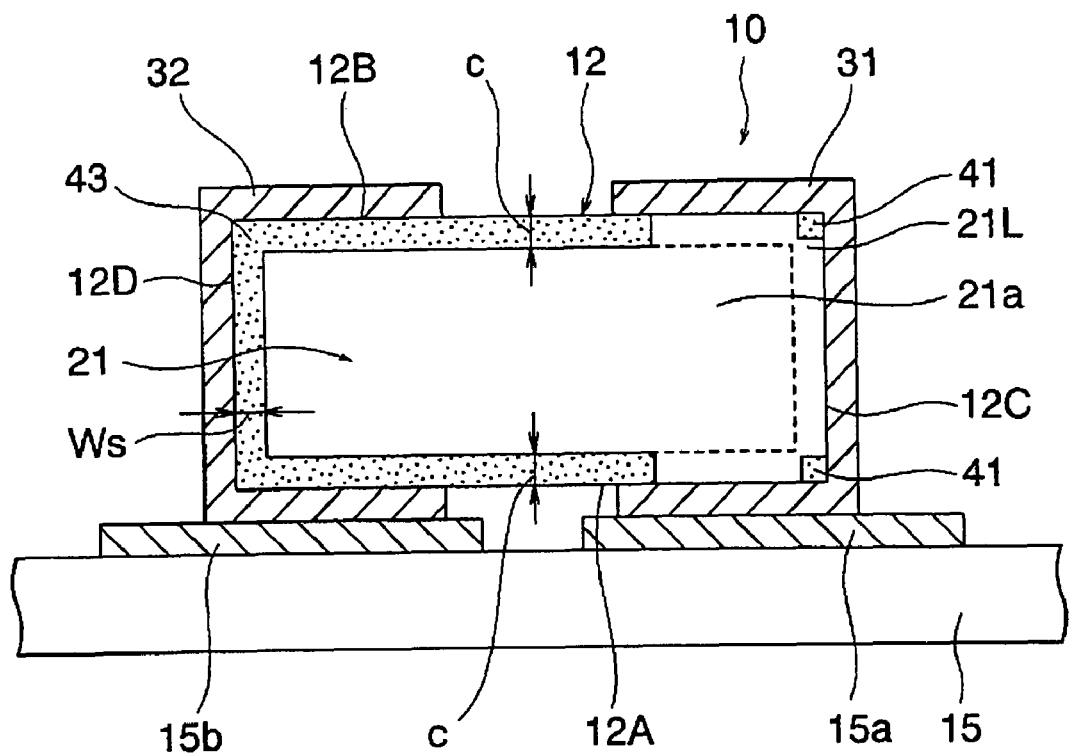
FIG. 8A is a plane view of a first conductor layer of a multilayer capacitor of a fourth embodiment of the present invention viewing from stacking direction Z.
Figure 8A:
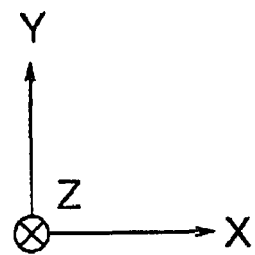

In the present embodiment, as shown in FIG. 8A, the first space pattern 41, which is not connected with the first terminal electrode 31, is formed on the first lead portion 21L at two positions, namely at a position along with the first side face 12A and the third side face 12C and at a position along with the second side face 12B and the third side face 12C.

Figure 8B:
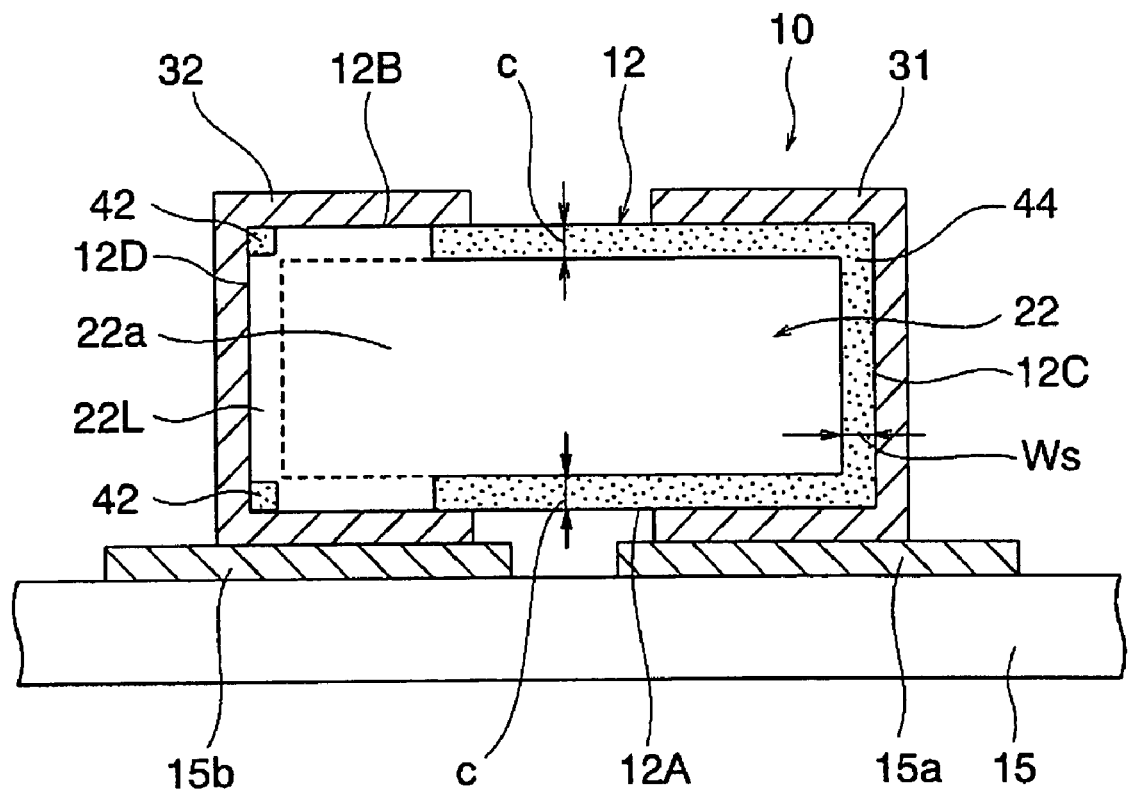
FIG. 8B is a plane view of a second conductor layer of the multilayer capacitor of the fourth embodiment of the present invention viewing from stacking direction Z.

In the present embodiment, as shown in FIG. 8B, the second space pattern 42, which is not connected with the second terminal electrode 32, is formed on the second lead portion 22L at two positions, namely at a position along with the first side face 12A and the fourth side face 12D and at a position along with the second side face 12B and the fourth side face 12D.

Fifth Embodiment

Next, a fifth embodiment of the present invention will be explained. Note that, in the following, explanation of common matters of the first embodiment and the fifth embodiment are omitted and only different points of the first embodiment will be explained.

Figure 9:
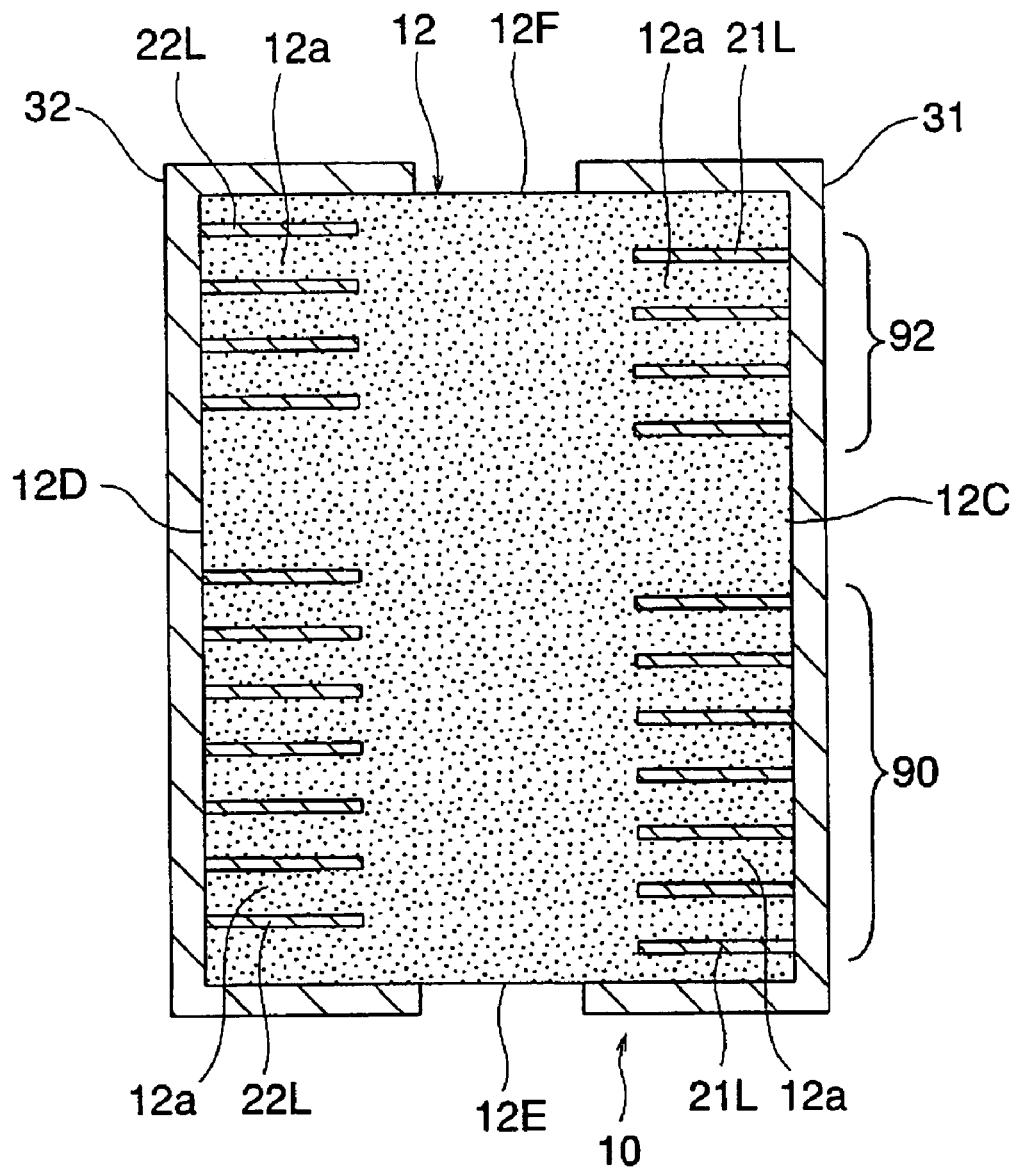
FIG. 9 is a cross sectional view of a first lead portion and a second lead portion of a multilayer capacitor of a fifth embodiment of the present invention in ZX plane direction.

In the present embodiment, as shown in FIG. 9, the dielectric body is composed of two multilayer portions 90, and 92. In this case, by setting an average of a value $(a+c)/(b \times n)$ measured from the multilayer portion 90 and a value $(a+c)/(b \times n)$ measured from the multilayer portion 92 less than 0.035, the ESL of the multilayer capacitor 10 of can be reduced to less than 60 pH.

Note that the present invention is not limited to the above embodiments and may be variously modified within the scope of the present invention.

For example, with respect to the multilayer capacitor 10, pluralities of the first conductor layer 21 or the second conductor layer 22 may comprise more than two kinds of conductor layers whose electrode pattern are different at XY plane, respectively. In this case, a length "a" and a space length "c" are measured by an average between more than two kinds of conductor layers. In this case, functions and effects similar to the above mentioned embodiments can be achieved as well.

EXAMPLES

Next, the present invention will be further explained based on specific examples, but the present invention is not limited to these examples.

Example 1

As an example 1, a two terminal type multilayer capacitor 10 according to the first embodiment shown in FIG. 1 is manufactured. Note that, in the example 1, a dimension of the dielectric body 12 "L0×W0×H0", widths Ws of insulating space patterns 43, 44 (FIGS. 4A, 4B), a length "a" of the first lead portion 21L and the second lead portion 22L in a direction X vertical to the stacking direction Z (FIG. 5), a length "b" between the first conductor layers 21e and the second conductor layer 22f positioned at both ends of the dielectric body 12 in the stacking direction Z (FIG. 3), a space length "c" of the first side face 12A and the first conductor layer 21 (a space length of the first side face 12A and the second conductor layer 22) (FIGS. 4A, 4B), a total number "n" of the first conductor layer 21 and the second conductor layer 22 (FIG. 3) are values shown in Table 1. From these parameters, $(a+c)/(b \times n)$ was calculated.

Also, impedance properties of the multilayer capacitor 10 of the example 1 were measured. In the measurement, the ESL (unit pH) of the capacitor samples was found by converting from S parameter to impedance by using impedance analyzer. Note that the ESL is obtained from the equation:

$$2\pi f_0 = 1/\sqrt{(ESL \cdot C)}$$

where $f_0$ is the self resonant frequency; and C is the electrostatic capacity. Results are shown in Table 1.

TABLE 1

| | L0 × W0 × H0 (mm) | Ws (μm) | a (mm) | b (mm) | c (mm) | n | (a + c)/(b × n) | ESL (pH) |
|---|---|---|---|---|---|---|---|---|
| Example 1 | 0.8 × 1.6 × 0.6 | 150 | 0.35 | 1.2 | 0.1 | 24 | 0.016 | 52 |
| Example 2 | 0.8 × 1.6 × 0.6 | 150 | 0.35 | 1.2 | 0.2 | 120 | 0.004 | 46 |
| Example 3 | 0.8 × 1.6 × 0.6 | 150 | 0.35 | 0.8 | 0.1 | 16 | 0.035 | 57 |
| Example 4 | 0.8 × 1.6 × 0.6 | 150 | 0.35 | 0.8 | 0.2 | 53 | 0.013 | 50 |

TABLE 1-continued

|  | L0 × W0 × H0 (mm) | Ws (μm) | a (mm) | b (mm) | c (mm) | n | (a + c)/(b × n) | ESL (pH) |
|---|---|---|---|---|---|---|---|---|
| ✗Comparative Example 1 | 0.8 × 1.6 × 0.6 | 150 | 0.35 | 0.6 | 0.1 | 12 | 0.063 | 76 |
| Example 5 | 0.8 × 1.6 × 0.6 | 150 | 0.35 | 0.6 | 0.2 | 60 | 0.015 | 50 |
| Example 6 | 0.8 × 1.6 × 0.6 | 150 | 0.6 | 1.2 | 0.2 | 24 | 0.028 | 54 |
| Example 7 | 0.8 × 1.6 × 0.6 | 150 | 0.6 | 1.2 | 0.1 | 120 | 0.005 | 47 |
| ✗Comparative Example 2 | 0.8 × 1.6 × 0.6 | 150 | 0.6 | 0.9 | 0.2 | 18 | 0.049 | 65 |
| Example 8 | 0.8 × 1.6 × 0.6 | 150 | 0.6 | 0.9 | 0.1 | 90 | 0.009 | 49 |
| ✗Comparative Example 3 | 0.8 × 1.6 × 0.6 | 150 | 0.6 | 0.6 | 0.2 | 12 | 0.111 | 98 |
| Example 9 | 0.8 × 1.6 × 0.6 | 150 | 0.6 | 0.6 | 0.1 | 60 | 0.019 | 54 |

Examples 2 to 9

Comparative Examples 1 to 3

Each capacitor of examples 2 to 9, comparative examples 1 to 3 were manufactured having structures similar to the examples 1, other than setting values of each parameters "L0×W0×H0", "Ws", "a", "b", "c", "n", (a+c)/(b×n) shown in table 1.

Also, the ESL (unit pH) of each capacitors were found by using similar method of the example 1. Results are shown in Table 1.

[Evaluation]

In examples 1 to 9, the ESL was 57 pH, because $(a+c)/(b \times n) \leq 0.035$.

On the other hand, in comparative examples 1 to 3, the ESL was more than 65 pH, because $(a+c)/(b \times n) > 0.035$.

From comparing the examples 1 to 9, and the comparative examples 1 to 3, it was confirmed that the ESL of the capacitor can be reduced according to as being $(a+c)/(b \times n) \leq 0.035$.

Figure 10:
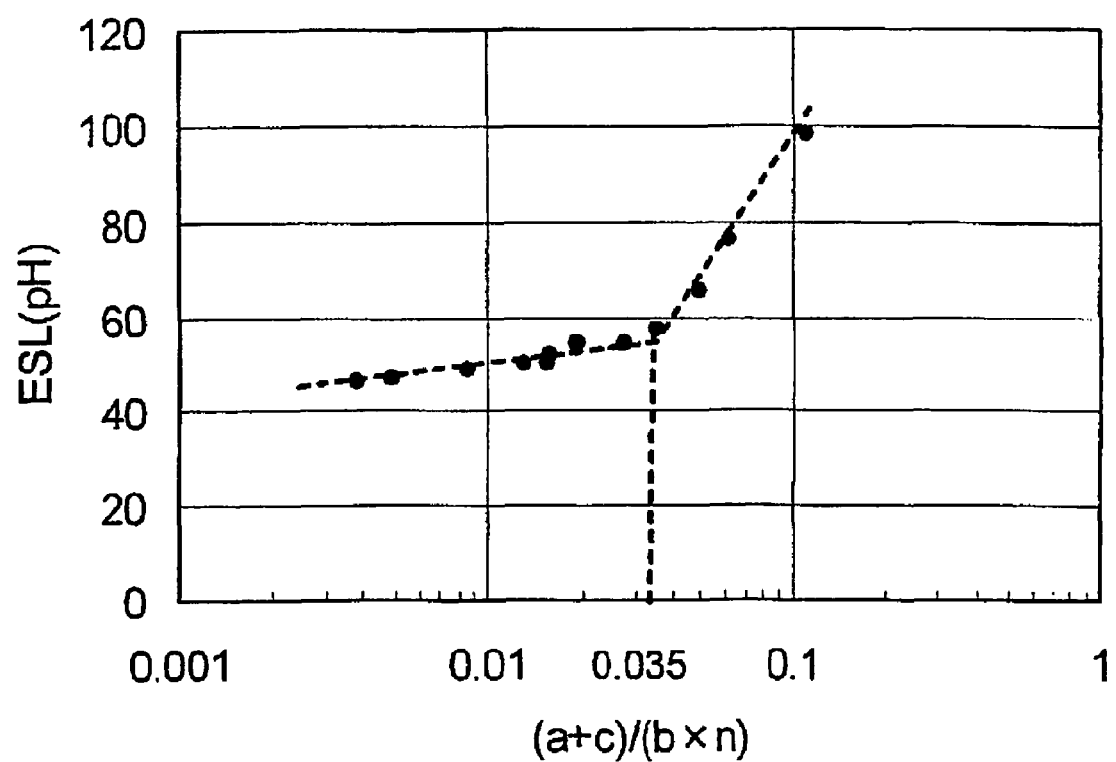
FIG. 10 is a graph showing ESL of each embodiment and each comparative examples of present invention.

FIG. 10 is a graph plotting the data of the examples 1 to 9 and the comparative examples 1 to 3, wherein a horizontal axis is $(a+c)/(b \times n)$ and a vertical axis is the ESL of the capacitor.

As shown in FIG. 10, it was confirmed as $(a+c)/(b \times n)$ becomes smaller, the ESL of the capacitor was reduced. Also, it was confirmed that as $(a+c)/(b \times n) = 0.035$ being an inflexion point, the ESL was greatly reduced (the ESL was reduced less than 60 pH) in a range of $(a+c)/(b \times n) \leq 0.035$.

The invention claimed is:

1. A multilayer capacitor comprising:
   a dielectric body having an approximately rectangular parallelepiped shape formed by alternately stacking a plurality of dielectric layers, first conductor layers and second conductor layers,
   a first terminal electrode formed on a first side face at least parallel to a stacking direction of said dielectric layers, said first conductor layers and said second conductor layers, and
   a second terminal electrode formed on said first side face apart from said first terminal electrode, wherein;
   said first conductor layer comprises a first lead portion led out to said first side face toward a corner portion and is directly connected to said first terminal electrode on at least three side faces;
   said second conductor layer comprises a second lead portion led out to said first face toward another corner portion and is directly connected to said second terminal electrode on at least three side faces;
   said first terminal electrode is formed straddling said first side face, a second side face opposed to said first side face, a third side face parallel to said stacking direction of said dielectric body, adjacent to said first side face and said second side face of said dielectric body, a fourth side face vertical to said stacking direction of said dielectric body and adjacent to said first to third side faces of said dielectric body, and a fifth side face opposed to said fourth side face;
   said second terminal electrode is formed straddling said first side face, said second side face, a sixth side face opposed to said third face of said dielectric body, said fourth side face and said fifth side face;
   said first lead portion led out straddling at least two side faces, the first and third side faces, of the dielectric body, which are adjacent to each other, and is connected with the first terminal electrode;
   said second lead portion led out straddling at least two side faces, the first and sixth side faces, of the dielectric body, which are adjacent to each other, and is connected with the second terminal electrode;
   said dielectric layers and each of said first conductor layers and said second conductor layers are vertically stacked to a plane direction of a substrate;
   a width L0 of said first side face and said second side face in the vertical direction to the stacking direction of said dielectric layers is smaller than a width W0 of said first side face and said second side face in the stacking direction of the dielectric layers;
   in the case that a length between said first lead portion and said second lead portion in a vertical direction to said stacking layer direction is "a" mm;
   in the case that in pluralities of said first conductor layers and said second conductor layers, a length between the conductor layers positioned at both ends of said dielectric body in said stacking direction is "b" mm;
   in the case that a space length between said first side face and said first conductor layers or between said first side face and said second conductor layers are "c" mm; and
   in the case that total number of said first conductor layers and said second conductor layers is "n";
   $(a+c)/(b \times n) \leq 0.035$,
   where "b" is 0.6 to 1.2.

2. The multilayer capacitor as set forth in claim 1, wherein;
   pluralities of said first conductor layers or said second conductor layers comprise more than two kinds of conductor layers having different electrode patterns, and said length "a" and said space length "c" are obtained respectively by calculating averages between more than two kinds of conductor layers.

3. The multilayer capacitor as set forth in claim 2, wherein;
   said first side face is to be set to face the substrate.

4. The multilayer capacitor as set forth in claim 2, wherein;
said first lead portion led out straddling said first side face, said second side face and said third side face and is connected to said first terminal electrode, and
said second lead portion led out straddling said first side face, said second side face and said sixth side face and is connected to said second terminal electrode.

5. The multilayer capacitor as set forth in claim 1, wherein;
said first side face is to be set to face the substrate.

6. The multilayer capacitor as set forth in claim 1, wherein;
said first lead portion led out straddling said first side face, said second side face and said third side face and is connected to said first terminal electrode, and
said second lead portion led out straddling said first side face, said second side face and said sixth side face and is connected to said second terminal electrode.

7. The multilayer capacitor as set forth in claim 6, wherein;
any one of said first side face and said second side face is to be set to face the substrate.

8. The multilayer capacitor as set forth in claim 1, wherein;
in said first lead portion, at a position along with said first side face, said second side face or said third face, a first space pattern is formed which is not connected to said first terminal electrode.

9. The multilayer capacitor as set forth in claim 1, wherein;
in said second lead portion, at a position along with said first side face, said second side face or said sixth side face, a second space pattern is formed which is not connected to said second terminal electrode.

10. The multilayer capacitor as set forth in claim 1, wherein;
the equivalent serial inductance (ESL) of the multilayer capacitor is less than 60 pH.

* * * * *